United States Patent
Faerberboeck et al.

(10) Patent No.: US 11,542,200 B2
(45) Date of Patent: Jan. 3, 2023

(54) COMPOSITION FOR FLOWABLE FIRE-RESISTANT MATERIALS

(71) Applicant: BASF SE, Ludwigshafen am Rhein (DE)

(72) Inventors: Adolf Faerberboeck, Trostberg (DE); Konrad Wutz, Trostberg (DE); Alexander Assmann, Trostberg (DE); Torben Gaedt, Trostberg (DE)

(73) Assignee: BASF SE

( * ) Notice: Subject to any disclaimer, the term of this patent is extended or adjusted under 35 U.S.C. 154(b) by 87 days.

(21) Appl. No.: 17/252,523

(22) PCT Filed: Jun. 25, 2019

(86) PCT No.: PCT/EP2019/066870
§ 371 (c)(1),
(2) Date: Dec. 15, 2020

(87) PCT Pub. No.: WO2020/007664
PCT Pub. Date: Jan. 9, 2020

(65) Prior Publication Data
US 2021/0261463 A1 Aug. 26, 2021

(30) Foreign Application Priority Data
Jul. 6, 2018 (EP) .................... 18182189

(51) Int. Cl.
*C04B 28/06* (2006.01)
*C04B 14/30* (2006.01)
*C04B 24/16* (2006.01)
*C04B 24/24* (2006.01)
*C04B 111/10* (2006.01)
*C04B 111/28* (2006.01)

(52) U.S. Cl.
CPC ............ *C04B 28/06* (2013.01); *C04B 14/303* (2013.01); *C04B 24/16* (2013.01); *C04B 24/246* (2013.01); *C04B 2111/10* (2013.01); *C04B 2111/28* (2013.01)

(58) Field of Classification Search
CPC ..... C04B 14/303; C04B 22/08; C04B 22/082; C04B 24/04; C04B 24/06; C04B 24/16; C04B 24/246; C04B 24/2647; C04B 24/2629; C04B 24/267; C04B 24/2658; C04B 24/2694; C04B 28/06; C04B 2103/22; C04B 2103/32; C04B 2111/00025; C04B 2111/10; C04B 2111/28
See application file for complete search history.

(56) References Cited

U.S. PATENT DOCUMENTS

| | | | |
|---|---|---|---|
| 9,828,291 B2* | 11/2017 | Boustingorry | C04B 28/06 |
| 9,963,386 B1* | 5/2018 | Griffard | C04B 2/04 |
| 2011/0269875 A1 | 11/2011 | Nicoleau et al. | |
| 2013/0295378 A1 | 11/2013 | Bonin et al. | |
| 2016/0280601 A1 | 9/2016 | Boustingorry et al. | |
| 2016/0340251 A1 | 11/2016 | Lettkeman et al. | |
| 2018/0022656 A1* | 1/2018 | Valverde | C04B 28/02 427/532 |
| 2020/0317905 A1* | 10/2020 | Gaedt | C04B 28/04 |

FOREIGN PATENT DOCUMENTS

| | | |
|---|---|---|
| EP | 1 535 887 A1 | 6/2005 |
| EP | 1535887 A1 | 6/2005 |
| KR | 10-2016-0082992 A | 7/2016 |
| KR | 10-2018-0035182 A * | 4/2018 |
| WO | 2006/042709 A1 | 4/2006 |
| WO | WO 2006/042709 A1 | 4/2006 |
| WO | 2010/040612 A1 | 4/2010 |
| WO | WO 2010/040612 A1 | 4/2010 |
| WO | 2015/036262 A1 | 3/2015 |
| WO | WO 2015/036262 A1 | 3/2015 |
| WO | 2018/029095 A1 | 2/2018 |
| WO | WO 2018/029095 A1 | 2/2018 |

OTHER PUBLICATIONS

International Preliminary Report on Patentability received for PCT Patent Application No. PCT/EP2019/066870, dated Jan. 21, 2021, 15 pages (8 pages of English Translation and 7 pages of Original Document).
International Search Report and Written Opinion received for PCT Patent Application No. PCT/EP2019/066870, dated Jul. 18, 2019, 17 pages (7 pages of English Translation and 10 pages of Original Documnet).
International Search Report dated Jul. 18, 2019 in PCT/EP2019/066870 filed on Jun. 25, 2019, 2 pages.

* cited by examiner

Primary Examiner — Anthony J Green
(74) Attorney, Agent, or Firm — Faegre Drinker Biddle & Reath LLP

(57) ABSTRACT

A composition may be suitable for flowable refractory materials and include calcium aluminate cement, a filler, a plasticizer in the form of a copolymer comprising polyether side chains, and a retarder having at least one acid. An article may include such a composition.

16 Claims, No Drawings

COMPOSITION FOR FLOWABLE FIRE-RESISTANT MATERIALS

The present invention relates to a composition for flowable refractory materials comprising calcium aluminate cement, a filler, a plasticizer in the form of a copolymer comprising polyether side chains, and a retarder comprising at least one acid. The present invention also relates to an article comprising said composition.

Plasticizers and setting retarders are organic or inorganic additives which lower the water requirement of unshaped refractory materials, in particular of what are known as castables. Such plasticizers are distinguished by the fact that they either improve the processability of the refractory material for the same water content or that a low water value can be set with their assistance with reduction of the addition of water and while maintaining the consistency of the material.

Aluminate cement-containing refractory materials are those in which a calcium aluminate cement (synonymous names: refractory cement, aluminous cement or high-alumina cement) functions as hydraulic binder. These cements are based on $Al_2O_3$-rich calcium or barium aluminates, the $Al_2O_3$ content being at least 35%. When classifying the cement content, the content of CaO as a hydrating element is decisive.

The use of boric acid and boric acid derivatives as setting retarder has proven useful for hydraulic binder compositions and in particular those comprising calcium aluminate cement. Binder compositions comprising boric acid as setting retarder are shapeable for a long period and feature good processability, while the strength values of the shaped bodies produced remain at a high level.

However, boric acid and boric esters have been classified as harmful to health according to current EC legislation (REACH). Starting from a boron content of 1%, corresponding to 5.5% boric acid or 8.5% borax, preparations must accordingly be identified as toxic using the hazard statements "May impair reproduction" and "May harm the unborn child". Due to these increasing requirements and in order to avoid hazards when using hydraulic binders, the use of boric acid-free setting retarders is preferable.

There is therefore a need for setting retarders for cement-containing hydraulic binders, in particular for flowable refractory materials, which do not comprise any boric acid or boric acid derivatives.

WO 2015/036262 describes, for example, plasticizing systems for binder compositions which, instead of boric acid, comprise mixtures of trisodium citrate, polycarboxylic esters and sulfonic acids as setting retarders. However, the binder compositions described are cement-free.

EP 1 535 887 A1 discloses binder compositions for refractory materials based on calcium aluminate cement which comprise boric acid-free setting retarders. However, the processing of these compositions requires a relatively large amount of mixing water, which has negative effects on the strength and durability of the resultant refractory material. In order to bring building material mixtures, in particular based on inorganic binders, into a ready-to-use, processable form, it is generally necessary to use substantially more mixing water than would be needed for the subsequent hydration/hardening process. The cavity content in the structure, formed as a result of the excess water which evaporates at a later stage, results in a significant deterioration in mechanical strength, stability and durability.

In order to reduce this excess water fraction for a given processing consistency, and/or to improve the processability for a given water/binder ratio, admixtures are used which are generally identified in construction chemistry as water reducers or plasticizers. Known such admixtures include primarily polycondensation products based on naphthalenesulfonic or alkylnaphthalenesulfonic acids, and sulfonic acid group-comprising melamine-formaldehyde resins. The binder composition described in EP 1 535 887 A1 comprises a condensate formed from β-naphthalene sulfonate and formalin as plasticizer. However, as indicated above, the required amount of mixing water is unsatisfactory in this case.

An object of the present invention was accordingly to provide a cement-containing, in particular calcium aluminate cement binder composition for refractory materials which is free from boric acid and boric acid derivatives and at the same time features good flow behavior and high strength values with a minimal amount of mixing water.

This object was achieved by a composition for flowable refractory materials, comprising
i) calcium aluminate cement,
ii) at least one filler,
iii) at least one plasticizer which comprises at least one copolymer comprising a main chain and polyether side chains, and
iv) at least one retarder comprising at least one acid.

Surprisingly, it has been found that a composition comprising calcium aluminate cement, a polymeric plasticizer having polyether side chains, and an acid as retarder exhibits good flow behavior and requires a minor amount of mixing water for the processing. It has been found that plasticizers based on lignosulfonate, melamine sulfonate and naphthalene sulfonate are markedly inferior to the copolymers according to the invention in terms of their efficacy. The flowability should in particular be emphasized in connection with the fact that the composition is preferably a refractory composition, in particular a free-flowing, refractory composition. The composition preferably comprises less than 3.0% by weight of Portland cement, more preferably less than 2.0% by weight, particularly preferably less than 1.0% by weight, based on the total weight of the composition.

According to a further preferred embodiment of the present invention, the main chain consists
i) of at least one structural unit which consists of a carbon chain having at least 16 carbon atoms,
or
ii) of at least one structural unit which consists of a $(C-C-O)_n$ chain, where n is a number of at least 5,
or
iii) of at least one structural unit which comprises an aromatic or a heteroaromatic system.

According to a further preferred embodiment of the present invention, the polyether side chains of the at least one copolymer are polyether side chains of structural unit (I)

$$*-U-(C(O))_k-X-(AlkO)_z-W \qquad (I)$$

where
* indicates the bonding site to the polymer,
U is a chemical bond or an alkylene group which has 1 to 8 carbon atoms and is unsubstituted or is substituted by at least one group from among carboxyester, carboxyl, phosphono, sulfino, sulfo, sulfamido, sulfoxy, sulfoalkyloxy, sulfinoalkyloxy and phosphonooxy,
X denotes oxygen, sulfur or a group $NR^1$,
k is 0 or 1,
z is an integer, the mean of which, based on the polymer, is in the range from 3 to 300, Alk is $C_2$-$C_4$-alkylene, where Alk may be identical or different within the group $(Alk-O)_z$, W denotes a hydrogen radical, a $C_1$-$C_6$-alkyl radical or an aryl radical or denotes the group Y—F, where Y is a linear or branched alkylene group which has 2 to 8 carbon atoms and which may bear a phenyl ring, F is a nitrogen-bonded 5- to 10-membered nitrogen heterocycle which may have, as ring members, in addition to the nitrogen atom and in addition to carbon atoms, 1, 2 or 3 additional heteroatoms selected from oxygen, nitrogen and sulfur, where the nitrogen ring members may have a group $R^2$, and where 1 or 2 carbon ring members may be present in the form of carbonyl group, $R^1$ is hydrogen, $C_1$-$C_4$-alkyl or benzyl, and $R^2$ is hydrogen, $C_1$-$C_4$-alkyl or benzyl.

According to a further preferred embodiment of the present invention, the at least one copolymer comprises at least one group from among carboxyester, carboxyl, phosphono, sulfino, sulfo, sulfamido, sulfoxy, sulfoalkyloxy, sulfinoalkyloxy and phosphonooxy groups.

According to a further preferred embodiment of the present invention, the at least one copolymer is a polycondensation product comprising (II) a structural unit having an aromatic or heteroaromatic system and the polyether group, and/or (III) a phosphated structural unit having an aromatic or heteroaromatic system.

The structural units (II) and (III) are particularly preferably represented by the following general formulae

A-U—(C(O))$_k$—X-(AlkO)$_z$—W　　　(II)

where

A is identical or different and is represented by a substituted or unsubstituted aromatic or heteroaromatic compound having 5 to 10 carbon atoms in the aromatic system, the further radicals having the definition given for structural unit (I);

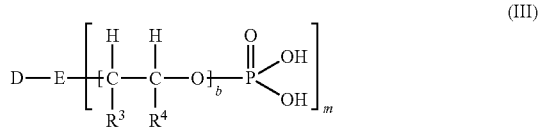

(III)

where

D is identical or different and is represented by a substituted or unsubstituted aromatic or heteroaromatic compound having 5 to 10 carbon atoms in the aromatic system, where E is identical or different and is represented by N, NH or O, where m=2 if E=N and m=1 if E=NH or O, where $R^3$ and $R^4$ are each independently identical or different and are represented by a branched or unbranched $C_1$- to $C_{10}$-alkyl radical, $C_5$- to $C_8$-cycloalkyl radical, aryl radical, heteroaryl radical or H, where b is identical or different and is represented by an integer of from 0 to 300.

According to a further preferred embodiment of the present invention, the at least one acid is selected from the group consisting of hydrochloric acid, sulfuric acid, nitric acid, phosphoric acid, acetic acid, citric acid, sulfonic acids, metal salts, and mixtures of these.

The metal salts are preferably aluminum salts.

According to a further preferred embodiment of the present invention, the at least one acid is a sulfonic acid of the formula (VII)

$R^{17}$—(CH$_2$)$_p$—SO$_3$M$_a$　　　(VII)

where $R^{17}$ is a branched or unbranched $C_1$-$C_{20}$-alkyl radical, is a $C_6$-$C_{10}$-aryl radical which can be unsubstituted or substituted by one or more branched or unbranched $C_1$-$C_{20}$-alkyl radicals, is NR$^{18}$R$^{19}$ or is a substituent of the formula (VIII),

(VIII)

$R^{18}$ and $R^{19}$ each independently can be identical or different and are hydrogen or branched or unbranched $C_1$-$C_{20}$-alkyl radicals, $R^{20}$ and $R^{21}$ are each independently hydrogen or a branched or unbranched $C_1$-$C_{20}$-alkyl radical, V is —O— or —NH—, $R^{22}$ is hydrogen or methyl, p is a number between 0 and 10, M is hydrogen, a metal cation or an ammonium cation, and a is 1 or 1/valence of the metal cation.

According to a further preferred embodiment of the present invention, the composition comprises i) 1.0% to 20.0% by weight of calcium aluminate cement, ii) 60.0% to 98.99% by weight of the at least one filler, iii) 0.01% to 3.0% by weight of the at least one plasticizer which comprises at least one copolymer comprising a main chain and polyether side chains, and iv) 0.01% to 5.0% by weight of the at least one retarder comprising at least one acid, based on the total weight of the composition.

The filler is particularly preferably aluminum oxide.

According to a further preferred embodiment of the present invention, the composition is free from boron.

The present invention also relates to an article which comprises the composition described above.

Said article is preferably a refractory article.

In a further aspect, the present invention relates to the use of a composition as flowable refractory materials, comprising i) calcium aluminate cement, ii) at least one filler, iii) at least one plasticizer which comprises at least one copolymer comprising a main chain and polyether side chains, and iv) at least one retarder comprising at least one acid.

According to a preference for the use, the main chain consists i) of at least one structural unit which consists of a carbon chain having at least 16 carbon atoms, or ii) of at least one structural unit which consists of a (C—C—O)$_n$ chain, where n is a number of at least 5, or iii) of at least one structural unit which comprises an aromatic or a heteroaromatic system.

According to a further preference for the use, the polyether side chains of the at least one copolymer are polyether side chains of structural unit (I)

  (I)

where indicates the bonding site to the polymer,

U is a chemical bond or an alkylene group which has 1 to 8 carbon atoms and is unsubstituted or is substituted by at least one group from among carboxyester, carboxyl, phosphono, sulfino, sulfo, sulfamido, sulfoxy, sulfoalkyloxy, sulfinoalkyloxy and phosphonooxy, X denotes oxygen, sulfur or a group NR$^1$, k is 0 or 1, z is an integer, the mean of which, based on the polymer, is in the range from 3 to 300, Alk is C$_2$-C$_4$-alkylene, where Alk may be identical or different within the group (Alk-O)$_z$, W denotes a hydrogen radical, a C$_1$-C$_6$-alkyl radical or an aryl radical or denotes the group Y—F, where Y is a linear or branched alkylene group which has 2 to 8 carbon atoms and which may bear a phenyl ring, F is a nitrogen-bonded 5- to 10-membered nitrogen heterocycle which may have, as ring members, in addition to the nitrogen atom and in addition to carbon atoms, 1, 2 or 3 additional heteroatoms selected from oxygen, nitrogen and sulfur, where the nitrogen ring members may have a group R$^2$, and where 1 or 2 carbon ring members may be present in the form of carbonyl group, R$^1$ is hydrogen, C$_1$-C$_4$-alkyl or benzyl, and R$^2$ is hydrogen, C$_1$-C$_4$-alkyl or benzyl.

According to a further preference for the use, the at least one copolymer comprises at least one group from among carboxyester, carboxyl, phosphono, sulfino, sulfo, sulfamido, sulfoxy, sulfoalkyloxy, sulfinoalkyloxy and phosphonooxy groups.

According to a further preference for the use, the at least one copolymer is a polycondensation product comprising (II) a structural unit having an aromatic or heteroaromatic system and the polyether group, and/or (III) a phosphated structural unit having an aromatic or heteroaromatic system.

According to a particular preference for the use, the structural units (II) and (III) are represented by the following general formulae

  (II)

where

A is identical or different and is represented by a substituted or unsubstituted aromatic or heteroaromatic compound having 5 to 10 carbon atoms in the aromatic system, the further radicals having the definition given for structural unit (I);

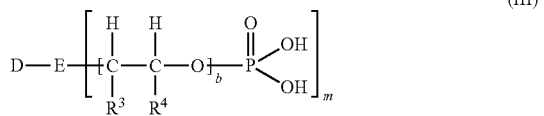  (III)

where

D is identical or different and is represented by a substituted or unsubstituted aromatic or heteroaromatic compound having 5 to 10 carbon atoms in the aromatic system, where E is identical or different and is represented by N, NH or O, where m=2 if E=N and m=1 if E=NH or O, where R$^3$ and R$^4$ are each independently identical or different and are represented by a branched or unbranched C$_1$- to C$_{10}$-alkyl radical, C$_5$- to C$_8$-cycloalkyl radical, aryl radical, heteroaryl radical or H, where b is identical or different and is represented by an integer of from 0 to 300.

According to a further preference for the use, the at least one acid is selected from the group consisting of hydrochloric acid, sulfuric acid, nitric acid, phosphoric acid, acetic acid, citric acid, sulfonic acids, metal salts, and mixtures of these.

According to a further preference for the use, the metal salts are aluminum salts.

According to a further preference for the use, the at least one acid is a sulfonic acid of the formula (VII)

  (VII)

where

R$^{17}$ is a branched or unbranched C$_1$-C$_{20}$-alkyl radical, is a C$_6$-C$_{10}$-aryl radical which can be unsubstituted or substituted by one or more branched or unbranched C$_1$-C$_{20}$-alkyl radicals, is NR$^{18}$R$^{19}$ or is a substituent of the formula (VIII),

  (VIII)

R$^{18}$ and R$^{19}$ each independently can be identical or different and are hydrogen or branched or unbranched C$_1$-C$_{20}$-alkyl radicals, R$^{20}$ and R$^{21}$ are each independently hydrogen or a branched or unbranched C$_1$-C$_{20}$-alkyl radical, V is —O— or —NH—, R$^{22}$ is hydrogen or methyl, p is a number between 0 and 10, M is hydrogen, a metal cation or an ammonium cation, and a is 1 or 1/valence of the metal cation.

According to a further preference for the use, the composition comprises i) 1.0% to 20.0% by weight of calcium aluminate cement, ii) 60.0% to 98.99% by weight of the at least one filler, iii) 0.01% to 3.0% by weight of the at least one plasticizer which comprises at least one copolymer comprising a main chain and polyether side chains, and iv) 0.01% to 5.0% by weight of the at least one retarder comprising at least one acid, based on the total weight of the composition.

According to a further preference for the use, the filler is aluminum oxide.

According to a further preference for the use, the composition is free from boron.

According to a further preference, the composition is a refractory composition. It is preferably a free-flowing refractory composition. Accordingly, the essential constituents are preferably calcium aluminate cement and aluminum oxide, which are preferably present in a total amount of at least 60% by weight, preferably at least 70% by weight and more preferably still at least 80% by weight.

According to a further preference, the composition comprises less than 3.0% by weight of Portland cement, more preferably less than 2.0% by weight, particularly preferably less than 1.0% by weight, based on the total weight of the composition.

According to a further preference, the composition comprises less than 3.0% by weight, more preferably less than 2.0% by weight, particularly preferably less than 1.0% by weight, of a sulfate source selected from the group of anhydrite ($CaSO_4$), calcium sulfate hemihydrate ($CaSO_4.0.5H_2O$) and/or gypsum ($CaSO_4.2H_2O$), based on the total weight of the composition.

The present invention is described in more detail below.

As explained above, the present invention relates to a composition for flowable refractory materials, comprising
i) calcium aluminate cement,
ii) at least one filler,
iii) at least one plasticizer which comprises at least one copolymer comprising a main chain and polyether side chains, and
iv) at least one retarder comprising at least one acid.

In the context of the present invention, the term "refractory material" refers to a composition from which refractory articles are obtained by heat-treating in the presence of water.

One of the principal components of the composition of the invention is calcium aluminate cement.

In the context of the present invention, the term "cement" refers to an inorganic, finely ground hydraulic binder. DIN EN 197-1 (November 2011) classifies the different types of cement into the categories CEM I-V. The term "cement" also includes cements according to EN 14216, calcium aluminate cements, calcium sulfoaluminate cements (CSA cements), and mixtures thereof.

Calcium aluminate cements comprise minerals of the formula $CaO.Al_2O_3$. They can be obtained for example by melting calcium oxide (CaO) or limestone ($CaCO_3$) with bauxite or aluminate. Calcium aluminate cements comprise about 20% to 40% by weight of CaO, up to 5% by weight of $SiO_2$, about 40% to 80% by weight of $Al_2O_3$, and up to about 20% by weight of $Fe_2O_3$. Calcium aluminate cements are defined in the standard DIN EN 14647 (January 2006).

Calcium sulfoaluminate cements may be produced from tricalcium aluminate ($3CaO.Al_2O_3$), anhydrite ($CaSO_4$), calcium sulfate hemihydrate ($CaSO_4.0.5H_2O$) and/or gypsum ($CaSO_4.2H_2O$).

The composition of the invention preferably comprises 1.0% to 20.0% by weight, more preferably 2.0% to 15.0% by weight, more preferably still 3.0% to 10.0% by weight, particularly preferably 4.0% to 6.0% by weight, of calcium aluminate cement, based on the total weight of the composition.

A further constituent of the composition of the invention is a filler.

In the context of the present invention, the term "filler" refers to materials which may be added to increase the volume without impairing the properties of the composition.

In the field of refractory materials, the use of aluminum oxide as filler has proven to be particularly advantageous. The filler used according to the invention is accordingly preferably aluminum oxide.

The filler preferably comprises calcined aluminum oxide; more preferably the filler consists of calcined aluminum oxide. In particular, this is calcined aluminum oxide having an average particle size of from 0.001 to 8 mm. According to a preferred embodiment of the present invention, the filler comprises at least one calcined aluminum oxide of the particle size stated. In particular, the filler can comprise two or more calcined aluminum oxides having differing particle sizes.

Processes for producing calcined aluminum oxide are known to those skilled in the art. For example, calcined aluminum oxide can be obtained from commercial aluminum hydroxide by thermal treatment and subsequent grinding. The calcination can be effected at temperatures of 1200 to 1800° C. in an aluminum oxide crucible or a gas-heated rotary furnace; the subsequent grinding can be carried out in industrial mills in a wet or dry process with suitable grinding media.

The composition of the invention preferably comprises 60.0% to 98.99% by weight, more preferably 70.0% to 92.0% by weight, more preferably still 80.0% to 90.0% by weight, particularly preferably 83.0% to 88.0% by weight, of the at least one filler, based on the total weight of the composition.

As explained above, the at least one filler is preferably aluminum oxide, particularly preferably calcined aluminum oxide.

The composition of the invention accordingly preferably comprises 60.0% to 98.99% by weight, more preferably 70.0% to 92.0% by weight, more preferably still 80.0% to 90.0% by weight, particularly preferably 83.0% to 88.0% by weight, of aluminum oxide, more preferably calcined aluminum oxide, based on the total weight of the composition.

The composition of the invention also comprises at least one plasticizer which comprises at least one copolymer comprising a main chain and polyether side chains.

The at least one copolymer is preferably a comb polymer consisting of a linear main chain which at regular intervals comprises relatively long side chains of virtually equal length.

The copolymer preferably consists in the main chain
i) of at least one structural unit which consists of a carbon chain having at least 16 carbon atoms,
or
ii) of at least one structural unit which consists of a (C—C—O)$_n$ chain, where n is a number of at least 5,
or
iii) of at least one structural unit which comprises an aromatic or a heteroaromatic system.

The structural unit consisting of a carbon chain having at least 16 carbon atoms is preferably substituted by at least one group from among alkyl, carboxyester, carboxyl, phosphono, sulfino, sulfo, sulfamido, sulfoxy, sulfoalkyloxy, sulfinoalkyloxy and phosphonooxy groups. Said group is particularly preferably a carboxyl group.

Accordingly, the structural unit comprising a carbon chain having at least 16 carbon atoms is preferably a polycarboxylate.

In the structural unit which consists of a (C—C—O)$_n$ chain, n is preferably a number of at least 5, more preferably a number of 5 to 70, more preferably still a number of 7 to 50.

The structural unit comprising an aromatic or a heteroaromatic system is preferably a polycondensation product.

The side chains of the copolymer are preferably polyether side chains.

According to a preferred embodiment of the present invention, said polyether side chains are polyether side chains of structural unit (I)

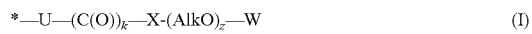

$$*-U-(C(O))_k-X-(AlkO)_z-W \quad (I)$$

where

\* indicates the bonding site to the polymer,

U is a chemical bond or an alkylene group which has 1 to 8 carbon atoms and is unsubstituted or is substituted by at least one group from among carboxyester, carboxyl, phosphono, sulfino, sulfo, sulfamido, sulfoxy, sulfoalkyloxy, sulfinoalkyloxy and phosphonooxy, X denotes oxygen, sulfur or a group $NR^1$, k is 0 or 1, z is an integer, the mean of which, based on the polymer, is in the range from 3 to 300, Alk is $C_2$-$C_4$-alkylene, where Alk may be identical or different within the group $(Alk-O)_z$, W denotes a hydrogen radical, a $C_1$-$C_6$-alkyl radical or an aryl radical or denotes the group Y—F, where Y is a linear or branched alkylene group which has 2 to 8 carbon atoms and which may bear a phenyl ring, F is a nitrogen-bonded 5- to 10-membered nitrogen heterocycle which may have, as ring members, in addition to the nitrogen atom and in addition to carbon atoms, 1, 2 or 3 additional heteroatoms selected from oxygen, nitrogen and sulfur, where the nitrogen ring members may have a group $R^2$, and where 1 or 2 carbon ring members may be present in the form of carbonyl group, $R^1$ is hydrogen, $C_1$-$C_4$-alkyl or benzyl, and $R^2$ is hydrogen, $C_1$-$C_4$-alkyl or benzyl.

The at least one branched copolymer preferably comprises at least one group from among carboxyester, carboxyl, phosphono, sulfino, sulfo, sulfamido, sulfoxy, sulfoalkyloxy, sulfinoalkyloxy and phosphonooxy groups. Said group is particularly preferably a carboxyl group.

According to a preferred embodiment of the present invention, said polyether side chains are accordingly polyether side chains of structural unit (I)

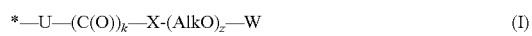

$$*-U-(C(O))_k-X-(AlkO)_z-W \quad (I)$$

where

\* indicates the bonding site to the polymer,

U is a chemical bond or an alkylene group which has 1 to 8 carbon atoms and is unsubstituted or is substituted by at least one carboxyl group, and the remaining radicals have the definitions given above.

In a preferred embodiment, the branched copolymer is a polycondensation product comprising (II) a structural unit having an aromatic or heteroaromatic system and the polyether group, and/or (III) a phosphated structural unit having an aromatic or heteroaromatic system.

The structural units (II) and (III) are preferably represented by the following general formulae

$$A-U-(C(O))_k-X-(AlkO)_z-W \quad (II)$$

where

A is identical or different and is represented by a substituted or unsubstituted aromatic or heteroaromatic compound having 5 to 10 carbon atoms in the aromatic system, the further radicals having the definition given for structural unit (I);

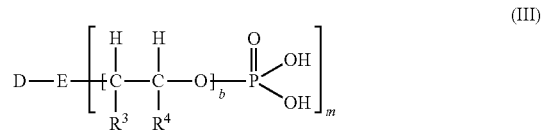

where

D is identical or different and is represented by a substituted or unsubstituted aromatic or heteroaromatic compound having 5 to 10 carbon atoms in the aromatic system.

In addition, E is identical or different and is represented by N, NH or O, m=2 if E=N and m=1 if E=NH or O.

$R^3$ and $R^4$ are each independently identical or different and are represented by a branched or unbranched $C_1$- to $C_{10}$-alkyl radical, $C_5$- to $C_8$-cycloalkyl radical, aryl radical, heteroaryl radical or H, preferably by H, methyl, ethyl or phenyl, particularly preferably by H or methyl and especially preferably by H. In addition, b is identical or different and is represented by an integer of from 0 to 300. If b=0, E=O. Particularly preferably, D=phenyl, E=O, $R^3$ and $R^4$=H and b=1.

The polycondensation product preferably comprises a further structural unit (IV) which is represented by the following formula

where

Y independently at each instance is identical or different and is represented by (II), (III) or further constituents of the polycondensation product.

$R^5$ and $R^6$ preferably are identical or different and are represented by H, $CH_3$, COOH or a substituted or unsubstituted aromatic or heteroaromatic compound having 5 to 10 carbon atoms. Here, $R^5$ and $R^6$ in structural unit (IV) are each independently preferably represented by H, COOH and/or methyl.

In a particularly preferred embodiment, $R^5$ and $R^6$ are represented by H.

The molar ratio of structural units (II), (III) and (IV) in the phosphated polycondensation product of the invention can be varied within wide ranges. It has proven expedient for the molar ratio of structural units [(II)+(III)]:(IV) to be 1:0.8 to 3, preferably 1:0.9 to 2 and particularly preferably 1:0.95 to 1.2.

The molar ratio of the structural units (II):(III) is usually 1:10 to 10:1, preferably 1:7 to 5:1 and particularly preferably 1:5 to 3:1.

The groups A and D in the structural units (II) and (III) of the polycondensation product are usually represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, preferably phenyl, where A and D can be selected independently of one another and can also each consist of a mixture of the compounds mentioned. The groups X and E are each independently preferably represented by O.

Preferably, z in structural unit (I) is represented by an integer of from 5 to 280, in particular 10 to 160 and particularly preferably 12 to 120, and b in structural unit (III) is represented by an integer of from 0 to 10, preferably 1 to 7 and particularly preferably 1 to 5. The respective radicals, the length of which is defined by z or b, may consist here of uniform component groups, but it may also be expedient for these to be a mixture of different component groups. In addition, the radicals of structural units (II) and (III) can each independently have the same chain length, z and b each being represented by a number. However, it will generally be expedient for these to each be mixtures having different chain lengths, so that the radicals of the structural units in the polycondensation product for z and independently for b have different numerical values.

In a particular embodiment, the present invention further envisages that a sodium, potassium, ammonium and/or calcium salt, and preferably a sodium and/or potassium salt, of the phosphated polycondensation product is involved.

The phosphated polycondensation product of the invention frequently has a weight-average molecular weight of 5000 g/mol to 150 000 g/mol, preferably 10 000 to 100 000 g/mol and particularly preferably 20 000 to 75 000 g/mol.

The phosphated polycondensation products that are preferably to be used according to the present invention are preparable by methods known to those skilled in the art. Suitable methods are described, for example, in WO 2006/042709 and WO 2010/040612.

In a further preferred embodiment, the plasticizer is at least one copolymer obtainable by polymerization of a mixture of monomers comprising (V) at least one ethylenically unsaturated monomer which comprises at least one radical from the group of carboxylic acid, carboxylic salt, carboxylic ester, carboxamide, carboxylic anhydride and carboximide and (VI) at least one ethylenically unsaturated monomer comprising the polyether group, the polyether group preferably being represented by the structural unit (I).

The copolymers according to the present invention comprise at least two monomer units. However, it can also be advantageous to use copolymers having three or more monomer units.

In a preferred embodiment, the ethylenically unsaturated monomer (V) is represented by at least one of the following general formulae from the group (Va), (Vb) and (Vc):

In the mono- or dicarboxylic acid derivative (Va) and the monomer (Vb) in cyclic form, where Z=O (acid anhydride) or $NR^{16}$ (acid imide), $R^7$ and $R^8$ are each independently hydrogen or an aliphatic hydrocarbon radical having 1 to 20 carbon atoms, preferably a methyl group. B denotes H, $-COOM_a$, $-CO-O(C_qH_{2q}O)_r-R^9$, $-CO-NH-(C_qH_{2q}O)_r-R^9$.

M denotes hydrogen, a mono-, di- or trivalent metal cation, preferably sodium, potassium, calcium or magnesium ion, or else ammonium or an organic amine radical, and a=⅓, ½ or 1, depending on whether M is a mono-, di- or trivalent cation. The organic amine radicals used are preferably substituted ammonium groups which derive from primary, secondary or tertiary $C_{1-20}$-alkylamines, $C_{1-20}$-alkanolamines, $C_{5-8}$-cycloalkylamines and $C_{6-14}$-arylamines. Examples of the corresponding amines are methylamine, dimethylamine, trimethylamine, ethanolamine, diethanolamine, triethanolamine, methyldiethanolamine, cyclohexylamine, dicyclohexylamine, phenylamine, diphenylamine in the protonated (ammonium) form.

$R^9$ denotes hydrogen, an aliphatic hydrocarbon radical having 1 to 20 carbon atoms, a cycloaliphatic hydrocarbon radical having 5 to 8 carbon atoms, an aryl radical having 6 to 14 carbon atoms, which may optionally be substituted, q=2, 3 or 4 and r=0 to 200, preferably 1 to 150. The aliphatic hydrocarbons here may be linear or branched and saturated or unsaturated. Preferred cycloalkyl radicals are considered to be cyclopentyl or cyclohexyl radicals, and preferred aryl radicals are considered to be phenyl or naphthyl radicals, which may especially also be substituted by hydroxyl, carboxyl or sulfonic acid groups.

In addition, Z is O or $NR^{16}$, where $R^{16}$ independently at each occurrence is identical or different and is represented by a branched or unbranched $C_1$- to $C_{10}$-alkyl radical, $C_5$- to $C_8$-cycloalkyl radical, aryl radical, heteroaryl radical or H.

The following formula represents monomer (Vc):

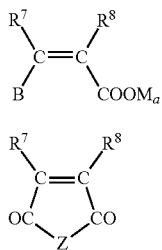

Here, $R^{10}$ and $R^{11}$ each independently are hydrogen or an aliphatic hydrocarbon radical having 1 to 20 carbon atoms, a cycloaliphatic hydrocarbon radical having 5 to 8 carbon atoms, an optionally substituted aryl radical having 6 to 14 carbon atoms.

In addition, $R^{12}$ is identical or different and is represented by $(C_nH_{2n})-SO_3H$ with n=0, 1, 2, 3 or 4, $(C_nH_{2n})-OH$ with n=0, 1, 2, 3 or 4; $(C_nH_{2n})-PO_3H_2$ with n=0, 1, 2, 3 or 4, $(C_nH_{2n})-OPO_3H_2$ with n=0, 1, 2, 3 or 4, $(C_6H_4)-SO_3H$, $(C_6H_4)-PO_3H_2$, $(C_6H_4)-OPO_3H_2$ and $(C_nH_{2n})-NR^{14}{}_b$ with n=0, 1, 2, 3 or 4 and b is represented by 2 or 3.

$R^{13}$ denotes H, $-COOM_a$, $-CO-O(C_qH_{2q}O)_r-R^9$, $-CO-NH-(C_qH_{2q}O)_r-R^9$, where $M_a$, $R^9$, q and r have the definitions given above.

$R^{14}$ is hydrogen, an aliphatic hydrocarbon radical having 1 to 10 carbon atoms, a cycloaliphatic hydrocarbon radical having 5 to 8 carbon atoms, an optionally substituted aryl radical having 6 to 14 carbon atoms.

In addition, Q is identical or different and is represented by NH, $NR^{15}$ or O, where $R^{15}$ is an aliphatic hydrocarbon radical having 1 to 10 carbon atoms, a cycloaliphatic hydrocarbon radical having 5 to 8 carbon atoms, or an optionally substituted aryl radical having 6 to 14 carbon atoms.

In a particularly preferred embodiment, the ethylenically unsaturated monomer (VI) is represented by the following general formulae $$\underset{H}{\overset{R^8}{\diagup}}C=C\underset{U-(C(O))_k-X-(AlkO)_z-W}{\overset{R^7}{\diagup}} \quad (VI)$$

in which all radicals have the definitions given above.

In particular, the copolymer has an average molecular weight (Mw) of between 5000 and 150 000 g/mol, particularly preferably 10 000 to 80 000 g/mol and very particularly preferably 15 000 to 60 000 g/mol, this being determined by gel permeation chromatography. The average molar mass and the conversion of the polymers are analyzed by means of size-exclusion chromatography (column combinations: Shodex OH-Pak SB 804 HQ and OH-Pak SB 802.5 HQ from Showa Denko, Japan; eluent: 80 vol. % of aqueous solution of $HCO_2NH_4$ (0.05 mol/l) and 20 vol. % of MeOH; 100 µl injection volume; 0.5 ml/min flow rate)).

Preferably, the copolymer of the invention meets the demands of industrial standard EN 934-2 (February 2002).

The composition of the invention preferably comprises 0.01% to 3.0% by weight, more preferably 0.025% to 2.0% by weight, more preferably still 0.05% to 1.0% by weight, particularly preferably 0.08% to 0.15% by weight, of the at least one plasticizer which comprises at least one copolymer, based on the total weight of the composition.

The at least one plasticizer particularly preferably consists of the at least one copolymer as defined above. According to a particularly preferred embodiment of the present invention, the composition does not comprise any further plasticizer besides the at least one plasticizer which comprises at least one copolymer.

Furthermore, the composition of the invention comprises at least one retarder comprising at least one acid.

In the context of the present invention, the terms "retarder" and "setting retarder" refer to an additive which slows the hardening of a binder composition.

According to a preferred embodiment of the present invention, the at least one acid is selected from the group consisting of hydrochloric acid, sulfuric acid, nitric acid, phosphoric acid, acetic acid, citric acid, sulfonic acids, metal salts, and mixtures of these.

The at least one acid is particularly preferably selected from the group consisting of hydrochloric acid, phosphoric acid, acetic acid, sulfonic acids, metal salts, and mixtures of these.

With regard to the metal salts, suitable metal salts in the context of the present invention are those which are acidic in aqueous solution. Particular preference is given to salts of magnesium, calcium, iron, zinc, aluminum, and mixtures of these.

The metal salt is particularly preferably at least one aluminum salt. Aluminum chloride is particularly preferred.

According to a further preferred embodiment of the present invention, the at least one acid is a sulfonic acid of the formula (VII)

$$R^{17}-(CH_2)_p-SO_3M_a \quad (VII)$$

where
$R^{17}$ is a branched or unbranched $C_1$-$C_{20}$-alkyl radical, is a $C_6$-$C_{10}$-aryl radical which can be unsubstituted or substituted by one or more branched or unbranched $C_1$-$C_{20}$-alkyl radicals, is $NR^{18}R^{19}$ or is a substituent of the formula (VIII), $$\underset{R^{22}}{\overset{O}{\diagdown}}C-V-\underset{R^{21}}{\overset{R^{20}}{\diagup}}C-* \quad (VIII)$$

$R^{18}$ and $R^{19}$ each independently can be identical or different and are hydrogen or branched or unbranched $C_1$-$C_{20}$-alkyl radicals,
$R^{20}$ and $R^{21}$ are each independently hydrogen or a branched or unbranched $C_1$-$C_{20}$-alkyl radical,
V is —O— or —NH—,
$R^{22}$ is hydrogen or methyl,
p is a number between 0 and 10,
M is hydrogen, a metal cation or an ammonium cation, and
a is 1 or 1/valence of the metal cation.

The at least one acid more preferably is a sulfonic acid of the formula (VII), where
$R^{17}$ is an unbranched $C_1$-$C_6$-alkyl radical or $NR^{18}R^{19}$,
$R^{18}$ and $R^{19}$ each independently can be identical or different and are hydrogen or branched or unbranched $C_1$-$C_{20}$-alkyl radicals,
$R^{20}$ and $R^{21}$ are each independently an unbranched $C_1$-$C_6$-alkyl radical,
W is —NH—,
$R^{22}$ is hydrogen,
p is a number between 0 and 5,
M is hydrogen, a metal cation or an ammonium cation, and
a is 1 or 1/valence of the metal cation.

The at least one acid particularly preferably is a sulfonic acid of the formula (VII), where
$R^{17}$ is an unbranched $C_1$-$C_2$-alkyl radical or $NR^{18}R^{19}$,
$R^{18}$ and $R^{19}$ are hydrogen,
$R^{20}$ and $R^{21}$ are methyl,
W is —NH—,
$R^{22}$ is hydrogen,
p is a number between 0 and 2, and
M is hydrogen.

According to a particularly preferred embodiment of the present invention, the at least one acid is amidosulfonic acid, methanesulfonic acid, 2-acrylamido-2-methylpropanesulfonic acid, or mixtures of these.

The composition of the invention preferably comprises 0.01% to 5.0% by weight, more preferably 0.012% to 3.0% by weight, particularly preferably 0.0125% to 0.12% by weight, of the at least one retarder comprising at least one acid, based on the total weight of the composition.

Accordingly, the composition of the invention comprises preferably 1.0% to 20.0% by weight, more preferably 2.0% to 15.0% by weight, more preferably still 3.0% to 10.0% by weight, particularly preferably 4.0% to 6.0% by weight of calcium aluminate cement, 60.0% to 98.99% by weight, more preferably 70.0% to 92.0% by weight, more preferably still 80.0% to 90.0% by weight, particularly preferably 83.0% to 88.0% by weight of the at least one filler, 0.01% to 3.0% by weight, more preferably 0.025% to 2.0% by weight, more preferably still 0.05% to 1.0% by weight, particularly preferably 0.08% to 0.15% by weight of the at least one plasticizer which comprises at least one copolymer, and 0.01% to 5.0% by weight, more preferably 0.012% to 3.0% by weight, particularly preferably 0.0125% to 0.12% by weight of the at least one retarder comprising at least one acid, based on the total weight of the composition.

More preferably, the composition of the invention consists of 1.0% to 20.0% by weight, more preferably 2.0% to 15.0% by weight, more preferably still 3.0% to 10.0% by weight, particularly preferably 4.0% to 6.0% by weight of calcium aluminate cement, 60.0% to 98.99% by weight, more preferably 70.0% to 92.0% by weight, more preferably still 80.0% to 90.0% by weight, particularly preferably 83.0% to 88.0% by weight of the at least one filler, 0.01% to 3.0% by weight, more preferably 0.025% to 2.0% by weight, more preferably still 0.05% to 1.0% by weight, particularly preferably 0.08% to 0.15% by weight of the at least one plasticizer which comprises at least one copolymer, and 0.01% to 5.0% by weight, more preferably 0.012% to 3.0% by weight, particularly preferably 0.0125% to 0.12% by weight of the at least one retarder comprising at least one acid, based on the total weight of the composition.

According to a preferred embodiment of the present invention, the composition of the invention is free from boron.

In the context of the present invention, the terms "free from boron" or "boron-free" mean that the composition of the invention does not comprise any boron or boron-containing compounds. The composition of the invention preferably comprises less than 1.0% by weight, more preferably less than 0.1% by weight, particularly preferably less than 0.01% by weight, of boron, based on the total weight of the composition. The proportion of boron and boron-containing compounds is particularly preferably below the detection limit of common analysis methods.

According to another preferred embodiment of the present invention, no boron or boron-containing compounds are used in the production of the composition of the invention.

The present invention further relates to an article which comprises the composition described above.

Said article is preferably a refractory article.

EXAMPLES

Materials Used

Tabular Alumina T 60 is the commercial calcined aluminum oxide from Almatis GmbH, having the grain sizes reported in table 1.

Reactive Alumina CL 370 is commercially available from Almatis GmbH.

Ca aluminate cement CA 270 is commercially available from Almatis GmbH.

Plasticizer 1 is the commercial plasticizer Castament FS 10 from BASF Construction Solutions GmbH, which is a pulverulent polymerization product based on polyethylene glycol.

Plasticizer 2 is the commercial plasticizer Castament FW 10 from BASF Construction Solutions GmbH, which is a pulverulent polymerization product based on polyethylene glycol and, in contrast to Castament FS 10, comprises additional lithium ions and therefore leads to accelerated hydration.

Plasticizer 3 is the commercial plasticizer naphthalene sulfonate polymers Flube OS 39 from Bozetto S.p.a.

Boric acid, amidosulfonic acid, phosphoric acid, acetic acid, aluminum chloride, 2-acrylamido-2-methylpropanesulfonic acid, hydrochloric acid, methanesulfonic acid, the acidic ion exchanger Dowex 50 WX 2 and aluminum dihydrogenphosphate are commercially available compounds from Sigma Aldrich.

Production of the Binder Mixtures

Production is effected in a Hobart A 200 pan mixer. All dry components with a total amount of 5000 g are premixed for 60 seconds at a stirring speed of 107 revolutions per minute, before the total amount of mixing water required is added in one step. After the addition of water, the mixture is stirred for a further 4 minutes.

The composition of the dry binder mixtures is summarized in table 1, the added amounts of plasticizer, mixing water and retarder in table 2.

TABLE 1

| Dry components of the binder mixtures | |
|---|---|
| Component | Proportion [% by weight] |
| Tabular Alumina T 60, 3-6 mm | 30 |
| Tabular Alumina T 60, 1-3 mm | 15 |
| Tabular Alumina T 60, 0.5-1 mm | 10 |
| Tabular Alumina T 60, 0.2-0.6 mm | 5 |
| Tabular Alumina T 60, 0-0.2 mm | 10 |
| Tabular Alumina T 60, 0-0.045 mm | 8 |
| Tabular Alumina T 60, 0-0.02 mm | 7 |
| Reactive Alumina CL 370 | 10 |
| Ca aluminate cement CA 270 | 5 |
| Total | 100 |

TABLE 2

| Additions of plasticizers, mixing water and retarders | |
|---|---|
| Component | Proportion [% by weight][1)] |
| Plasticizer 1[3)] | 0.1 |
| Plasticizer 2[3)] | 0.1 |
| Addition of water | 4.9 |
| Addition of retarder | 0.0125-0.12[2)] |

[1)]Based on the total amount of dry components according to table 1
[2)]The precise retarder dosages can be found in table 3
[3)]In comparative example 5, only 0.1% by weight of plasticizer 3 is used overall instead, and in comparative example 6 only 0.5% by weight of plasticizer 3 is used overall.

Slump

Four flow cones according to EN 1402-4:2003 are filled with the freshly prepared binder mixture. The slump is determined after 10, 30, 60 and 120 minutes after filling by raising the flow cone and removing material adhering to the wall of the flow cone and carefully adding it to the flowing material. When the material comes to a standstill (two minutes after the flow cone was raised), the diameter of the flow cake is determined in two perpendicular directions. The values in [cm] given in the table correspond to the arithmetic mean of both directions.

Since the internal diameter of the flow cone is 10 cm, a slump of 10 cm means that the material has not moved after raising of the flow cone.

In order to determine the fresh concrete density, the freshly prepared material was slowly filled into a 250 ml plastic beaker and the ratio of intrinsic mass and volume was determined.

Strength Values

Flexural strength and compressive strength according to DIN EN 196-1 were determined 24 hours after mixing, using test specimens having the dimensions 40×40×160 mm$^3$ which were stored at 20° C. and 65% atmospheric humidity. The values reported in table 3 correspond to arithmetic means of three measured test specimens.

The slumps and strength values summarized in table 3 show that the slumps and strengths of refractory materials having boron-free retarders employing branched with polyalkylene oxide side chains as plasticizer are comparable to the properties of boric acid-containing compositions. A relatively small amount of mixing water is required for this, according to table 2.

The strengths are similar to or better than those in the case of the boric acid-containing system. Compared to the reference without retarder, the processing time is at least 60 minutes, whereas the reference system without retarder can be processed for only 10 minutes.

Y is a linear or branched alkylene group comprising 2 to 8 carbon atoms and optionally bearing a phenyl ring, F is a nitrogen-bonded 5- to 10-membered nitrogen heterocycle optionally comprising, as ring members, in addition to the nitrogen atom and carbon atoms, 1, 2, or 3 additional oxygen, nitrogen, and/or sulfur, where the nitrogen ring members optionally comprise a group $R^2$, and 1 or 2 carbon ring members optionally form a carbonyl group,

TABLE 3

Slump and strength values

| No. | Retarder | Dosage [%] | Slump 10 min [cm] | Slump 30 min [cm] | Slump 60 min [cm] | Slump 120 min [cm] | Flexural tensile strength [MPa] | Compressive strength [MPa] |
|---|---|---|---|---|---|---|---|---|
| C 1 | (without) | — | 22.3 | 10 | — | — | | |
| C 2 | Boric acid | 0.0125 | 27 | 28 | 11 | 10 | 4.6 | 23 |
| C 3 | Boric acid | 0.0250 | 26.5 | 26.5 | 26 | 23.5 | 4.9 | 25 |
| C 4 | Boric acid | 0.0500 | 24.5 | 25 | 23.5 | 22.5 | 4.2 | 24 |
| C 5 | Amidosulfonic acid[1] | 0.0600 | 10[3] | | | | | |
| C 6 | Amidosulfonic acid[2] | 0.0600 | 10[3] | | | | | |
| I 1 | Amidosulfonic acid (99.8%) | 0.0300 | 25 | 26 | 10 | 10 | 4.4 | 21 |
| I 2 | Amidosulfonic acid (99.8%) | 0.0600 | 24 | 24.5 | 23 | 20.5 | 4.5 | 22 |
| I 3 | Amidosulfonic acid (99.8%) | 0.1200 | 19.5 | 21 | 20 | 20 | 5.4 | 25 |
| I 4 | Phosphoric acid (85%) | 0.0300 | 25.5 | 26.5 | 25.5 | 25 | 5.8 | 31.4 |
| I 5 | Acetic acid (99.9%) | 0.0600 | 20.5 | 21 | 20.5 | 16 | 4.5 | 21.9 |
| I 6 | Aluminum chloride | 0.0300 | 21.5 | 21.4 | 20.2 | 19.1 | — | — |
| I 7 | 2-acrylamido-2-methylpropanesulfonic acid | 0.1000 | 22.6 | 22.3 | 21.2 | 19.2 | — | — |
| I 8 | Hydrochloric acid (15%) | 0.0150 | 21.2 | 21.2 | 17.8 | 10 | — | — |
| I 9 | Methanesulfonic acid | 0.0600 | 21.0 | 22.2 | 20.4 | 10.0 | — | — |
| I 10 | Dowex 50 WX 2 (acidic ion exchanger) | 0.6000 | 26.3 | 27.0 | 24.6 | 10 | 4.9 | 24.2 |
| I 11 | Aluminum dihydrogenphosphate (95%) | 0.0125 | 26.7 | 26.5 | 10 | 10 | — | — |
| I 12 | Aluminum dihydrogenphosphate (95%) | 0.0250 | 26.0 | 25.9 | 24.6 | 23.3 | 5.7 | 28 |
| I 13 | Aluminum dihydrogenphosphate (95%) | 0.0500 | 21.2 | 21.1 | 21.0 | 19.8 | — | — |

[1] 0.1% by weight of plasticizer 3
[2] 0.5% by weight of plasticizer 3
[3] not processible

The invention claimed is:

1. A composition suitable for a flowable refractory material, the composition comprising:
   calcium aluminate cement;
   a filler;
   a plasticizer comprising a copolymer comprising a main chain and polyether side chains,
   wherein the polyether side chains of the copolymer are polyether side chains of structural unit (I)

   $$*\text{-U-(C(O))}_k\text{—X-(AlkO)}_z\text{-W} \quad (I),$$

wherein
   * is a bonding site to the polymer,
   U is a chemical bond or an alkylene group comprising 1 to 8 carbon atoms and optionally substituted by at least one carboxyester, carboxyl, phosphono, sulfino, sulfo, sulfamido, sulfoxy, sulfoalkyloxy, sulfinoalkyloxy, and/or phosphonooxy,
   X is oxygen, sulfur, or $NR^1$,
   k is 0 or 1,
   z is an integer, a mean of which, based on the polymer, is in a range of from 3 to 300,
   Alk is independently $C_2$-$C_4$-alkylene,
   W is H, a $C_1$-$C_6$-alkyl radical, an aryl radical, or Y—F,
   $R^1$ is H, $C_1$-$C_4$-alkyl, or benzyl, and
   $R^2$ is H, $C_1$-$C_4$-alkyl, or benzyl;
   and
   a retarder comprising an acid.

2. The composition of claim 1, wherein the main chain
   (i) consists of at least one structural unit consisting of a carbon chain having at least 16 carbon atoms,
   or
   (ii) consists of at least one structural unit consisting of a (C—C—O)$_n$ chain, n being number of at least 5,
   or
   (iii) consists of at least one structural unit consisting an aromatic or a heteroaromatic system.

3. The composition of claim 1, wherein the copolymer comprises carboxyester, carboxyl, phosphono, sulfino, sulfo, sulfamido, sulfoxy, sulfoalkyloxy, sulfinoalkyloxy, and/or phosphonooxy group.

4. The composition of claim 1, wherein the copolymer is a polycondensation product comprising
   (II) a structural unit comprising an aromatic or heteroaromatic system and the polyether group, and/or
   (III) a phosphated structural unit comprising an aromatic or heteroaromatic system.

5. The composition of claim 4, wherein the structural units (II) and (III) have formulae

$$\text{A-U-(C(O))}_k\text{—X-(AlkO)}_z\text{-W} \quad (II),$$

wherein

A is independently an optionally substituted aromatic or heteroaromatic compound comprising 5 to 10 carbon atoms in the aromatic system, further radicals as defined for structural unit (I);

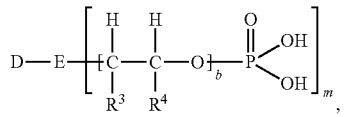
(III)

wherein

D is independently an optionally substituted aromatic or heteroaromatic compound comprising 5 to 10 carbon atoms in the aromatic system, wherein E is independently N, NH, or O, m is 2 if E is N and m is 1 if E is NH or O, $R^3$ and $R^4$ are independently a $C_1$- to $C_{10}$-alkyl radical, $C_5$- to $C_8$-cycloalkyl radical, aryl radical, heteroaryl radical, or H, b is independently an integer in a range of from 0 to 300.

6. The composition of claim 1, wherein the acid comprises hydrochloric acid, sulfuric acid, nitric acid, phosphoric acid, acetic acid, citric acid, sulfonic acid, and/or metal salt.

7. The composition of claim 6, wherein the metal salt is present and comprises an aluminum salt.

8. The composition of claim 6, wherein the acid is a sulfonic acid of formula (VII)

(VII), wherein $R^{17}$ is a $C_1$-$C_{20}$-alkyl radical, $C_6$-$C_{10}$-aryl radical optionally substituted by one or more $C_1$-$C_{20}$-alkyl radicals, $NR^{18}R^{19}$, or a substituent of formula (VIII),

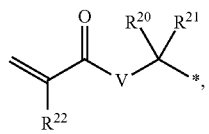
(VIII)

$R^{18}$ and $R^{19}$ are independently H or $C_1$-$C_{23}$-alkyl, $R^{20}$ and $R^{21}$ are independently H or $C_1$-$C_{20}$-alkyl, V is —O— or —NH—, $R^{22}$ is H or methyl, p is a number in a range of from 0 to 10, M is H, a metal cation, or an ammonium cation, and a is 1 or 1/valence of the metal cation.

9. The composition of claim 8, wherein the acid is a sulfonic acid of formula (VII), wherein $R^{17}$ is an unbranched $C_1$-$C_2$-alkyl radical or $NR^{18}R^{19}$, $R^{18}$ and $R^{19}$ are H, $R^{20}$ and $R^{21}$ are methyl, W is —NH—, $R^{22}$ is H, p is a number in a range of from 0 to 2, and M is H.

10. The composition of claim 1, comprising, based on total composition weight:
the calcium aluminate cement in a range of from 1.0 to 20.0 wt. %,
the filler in a range of from 60.0 to 98.99 wt. %,
the plasticizer in a range of from 0.01 to 3.0 wt. %; and
the retarder in a range of from 0.01 to 5.0 wt. %.

11. The composition of claim 1, wherein the filler is aluminum oxide.

12. The composition of claim 1, which is free from boron.

13. The composition of claim 1, comprises Portland cement in an amount of less than 3.0 wt. %, based on total composition weight.

14. An article, comprising:
the composition of claim 1.

15. A flowable refractory material, comprising:
the composition of claim 1.

16. A refractory article, comprising:
the composition of claim 1.

* * * * *